Nov. 25, 1958    C. F. SASSERSON ET AL    2,861,708
CARGO TANK
Original Filed May 10, 1954
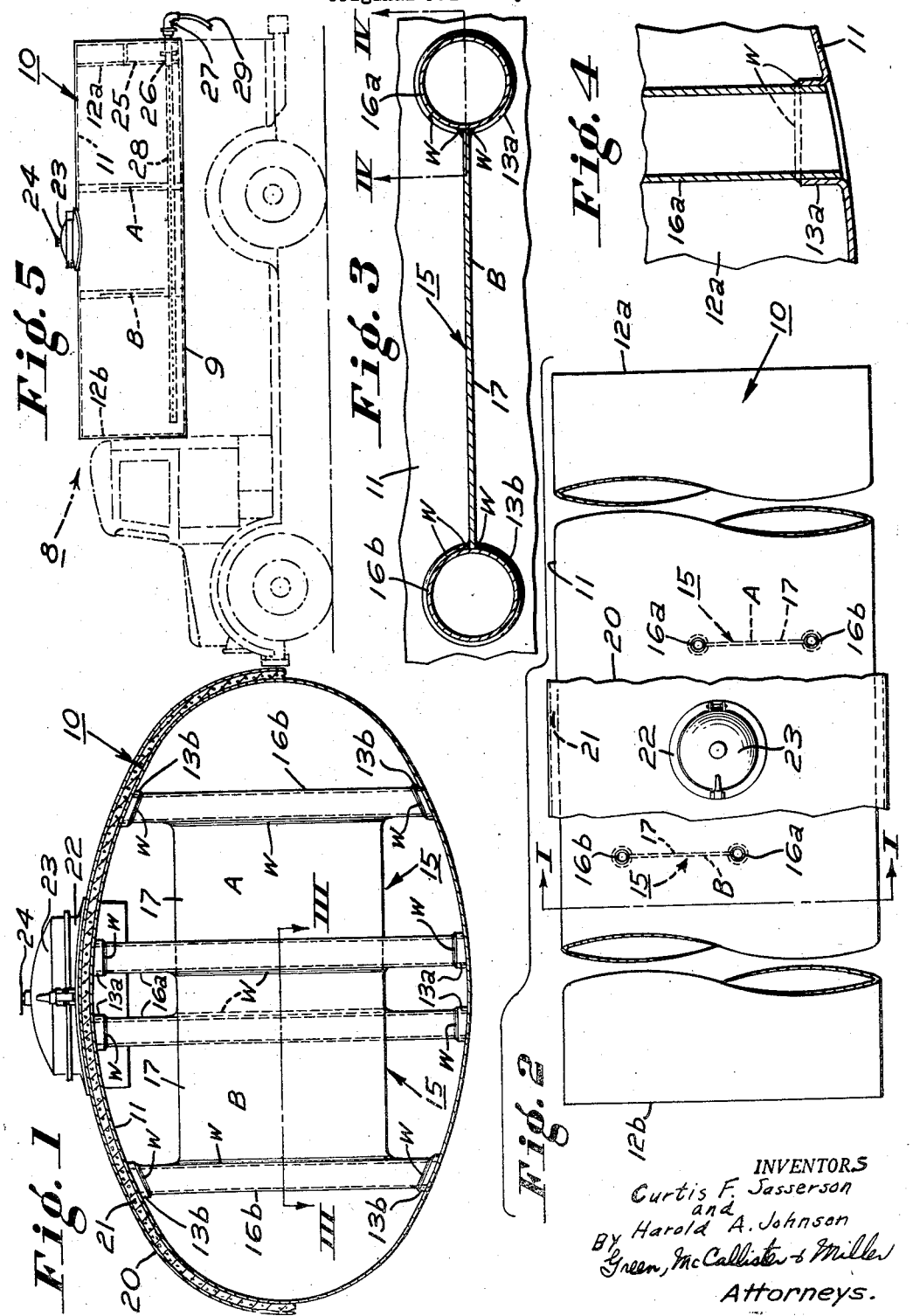
INVENTORS
Curtis F. Sasserson
and
Harold A. Johnson
By Green, McCallister & Miller
Attorneys.

United States Patent Office 2,861,708
Patented Nov. 25, 1958

2,861,708

CARGO TANK

Curtis F. Sasserson and Harold A. Johnson, Warren, Pa., assignors to Pennsylvania Furnace and Iron Company, Warren, Pa., a corporation of Pennsylvania Continuation of application Serial No. 428,464, May 10, 1954. This application March 12, 1958, Serial No. 723,935

14 Claims. (Cl. 220—22)

This application relates to cargo or trailer tanks for transporting liquids and particularly, to cargo tanks or tank-like containers for transporting liquids under highly sanitary conditions.

It is well recognized by those skilled in the art that cargo tanks for transporting liquids must be constructed to withstand not only static pressure or force of the liquid load, but also kinetic pressure or force due to a shifting of the load during the starting, stopping and operation of the power or motive unit. As a result, it has been customary to employ baffle or bulkhead means in the tanks to dampen surging and shifting of the load, since an unrestrained movement of the load may cause the tank to tear loose from its motive or transporting unit or to lose its rear or front nose section.

When baffles or bulkheads are employed, they have, however, presented a problem from the standpoint of cleaning out the inside of the tank when, as customary with some users, a tank is used for transporting different types of materials at different seasons of the year. In this connection, a tank may be employed to transport fuel oil during the winter months and to transport asphalt or liquid fertilizer during the summer months.

Another and very serious problem is presented when the tank is used for transporting food products, such as milk, from the standpoint of providing and maintaining highest sanitary conditions within its interior. In usage of this type, the interior of the tank has to be cleaned out frequently and old liquid, dirt and bacterial-harboring or trapping corners, edges, crevices, or rough interior surfaces must be avoided.

There have been many attempts to provide a tank construction that will fully meet the problem presented, but from our knowledge and experience in this particular field, none of them have been satisfactory and fully acceptable, particularly from the standpoint of sanitary authorities. Thus, the sanitary codes of some states, such as New York, prohibit the use of prior types of baffles or bulkhead constructions in milk tanks.

One prior type of construction has a series of longitudinally spaced-apart, single thickness, metal partition-like baffle members that are mounted to extend crosswise of the interior of the tank to define compartments therein. The baffle members are slightly bowed towards an end of the tank and have rim portions that abut the tank wall and whose edges are fillet-welded thereto.

Another and later type of construction employs baffle member pairs instead of single members; one member of each pair is bowed towards one end of the tank and the other member is bowed towards the opposite end, in such a manner that the members of each pair are in a back-to-back relationship with their welded rim portions extending towards opposite end of the tank.

A central opening or connecting passageway has been provided through the baffle member of both of the above types to provide fluid-communication between compartments and is of a size to permit a man to crawl through the baffle structure from one compartment to another. He has to lift his portable cleaning equipment through the openings from one compartment to another. In both types, access is gained to the inside of the tank through a top manhole above the central compartment therein. Although the second type eliminates the dirt-collecting joints or corners that are present on the in-turned side of the rim portion of each baffle member of the first type of construction, both types involve tedious cleaning-out operations, since each compartment is, in effect, a substantially separate unit.

This application is a continuation of our application Serial No. 428,464, filed May 10, 1954, entitled Cargo Tank, and which has been abandoned in favor of the present application.

It has thus been an object of our invention to devise a practical solution to the problems thus presented;

Another object has been to provide a new and improved bulkhead construction that will provide a cargo tank with the necessary protection against movement of a liquid, semi-liquid or flowable type of cargo and that will, at the same time, facilitate a thorough and effective cleaning out of its interior.

A further object has been to devise a tank construction that combines strength and volumetric capacity, that eliminates dirt harboring or trapping corners, etc., and that, at the same time, is much more readily accessible for cleaning.

A still further object has been to provide a baffled tank construction which is adapted for the utilization of a mechanical cleaner or sparger.

The objects stated are merely illustrative. These and other objects will become apparent from a study of the following specification and the accompanying drawing in which:

Figure 1 is a transverse sectional view of a tank construction utilizing our invention, taken along the line I—I of Figure 2;

Figure 2 is a top elevational view, partially broken away, and on a reduced scale of the tank of Figure 1;

Figure 3 is an enlarged horizontal end section of a damping and strengthening deflection unit as utilized in the tank construction of our invention; it is taken along the line III—III of Figure 1;

Figure 4 is an end section in elevation on the scale of and taken along line IV—IV of Figure 3, showing, in part, a bottom wall of the tank construction and one leg of the deflection unit;

Figure 5 is a reduced side elevation of a truck carrying a tank construction which utilizes our invention.

In accordance with our invention, we provide a foolproof and effective type of baffle or deflection unit construction and mounting such that controlling factors and requirements are fully met and, for the first time, a full solution to the problems involved has been attained. That is, our construction is such that we have been able to eliminate the old bowed-in, elliptical or curvilinear partition-like baffle structure whose rim portions form a seal about the interior of the tank. We obtain a baffle construction that is structurally effective from the standpoint of strength requirements and ease of assembly and that, at the same time, is highly effective in damping and controlling load movement or surges without damage to the tank or its mounting structure, even where the load is subjected to abrupt stops and starts of the motive means employed. The interior of the cargo tank is such that the tank has met with approval from the standpoint of sanitary authorities for use in carrying milk, etc.

In carrying out our invention, we provide deflection units 15 of substantially H-shape that are employed in transversely-offset or staggered pairs and in a longitudinally spaced-apart relationship with each other. One or a series of such pairs are utilized, depending on the length of the tank or the amount of load surge that is to be controlled. Each deflection unit 15 has a pair of end uprights, support column legs, members or standards comprising members 16a and 16b that are shown as of tubular construction. It will be noted that the leg members 16a are of longer extent than the members 16b to conform to their relative positions within a longitudinally-extending curvilinear, inner, enclosing shell or wall 11 of a tank 10. A deflector plate member 17 is mounted at its ends to extend centrally-transversely across between side portions and within end reaches of the legs 16a and 16b and is secured integrally thereto by a fillet weld w that is continuous along its opposite side, its top and bottom edges to fully seal off the joint, see Figures 1 and 3. It will be apparent that the top and bottom (opposite) reaches of the member 17 are of shortened extent with respect to corresponding reaches of the leg members 16a and 16b. It will thus be noted when the unit 15 is mounted in position within the interior of the inner shell 11 of the tank 10 that it defines upper and lower clearance spaces with the top and bottom portions of the shell 11. The shell 11 provides a longitudinally-extending enclosing wall of curvilinear cross-section that, with end walls or portions 12a and 12b, defines an internal load-receiving chamber within the tank. It will also be noted that the support legs 16a and 16b define side clearance spaces with the opposite side portions of the shell 11 and that longitudinally-through side spaces are defined by staggered pairs of or a series of deflection units, see for example units A and B of Figures 1 and 2.

Each unit 15 may be fully fabricated and its parts 16 and 17 assembled and integrally secured in position before the unit is introduced into the shell 11. In this connection, one or both the back and front end portions 12a and 12b of the shell 11 (see Figure 5) may be secured or welded in position after the units 15 have been positioned and secured in position with the shell. It will be noted from Figures 1 and 2 that the baffle units A and B have a sufficient longitudinal spacing (relatively wide) for a man to walk between them from one end of the tank to another. This is true, although the inner transverse end or side portions of each unit fully overlap each other to dampen a through-surge of the load centrally-longitudinally of the tank.

As shown particularly in Figures 1 and 4, the units 15 are mounted in position by piercing and punching-in localized areas of the shell 11 on an axis that is aligned with the top and bottom ends of the leg supports 16a and 16b to form inwardly-projecting securing means, namely integral flanges, ring-shaped or annular collars 13a and 13b. Fillet welds w (see Figure 4) about inner edges of the collars 13 secure the leg supports 16a and 16b in position within the collars and seal-off the joints.

By way of illustration, see Figure 5 of the drawings, we have shown a truck 8 having a bed 9 on which the tank 10 is securely mounted. Also, as indicated in Figure 1, the tank 10 will usually have an outer shell 20 and an intermediate insulating layer 21, for example of cellular construction, between the inner and outer shells 11 and 20, respectively. We have also shown a manhole portion 22 located at the top longitudinal center of the tank 10 and having a hinged dust cover 23. The man hole portion 22 is employed for access purposes and its cover 23 has a holddown clamp 24.

Referring particularly to Figure 5, the tank 10 is shown provided with an inwardly-offset back compartment 25 into which an outlet 26 extends from the bottom of the inner shell or enclosing wall 11. As shown, the outlet 26 may now be employed for the introduction of a mechanical cleaner or sparger 27. The sparger 27 is shown provided with a longitudinally-extending member 28 which, as indicated, may have a series of openings therealong for introducing cleaning fluid into the tank through tubing 29 under positive fluid pressure and for removing fluid from the tank under suction or negative fluid pressure. As shown in Figure 1, the longer legs 16a of the units 15 lie on opposite sides of a central longitudinal axis of the shell 11 and have a transversely spaced-apart relationship such that the sparger 28 may be introduced longitudinally therebetween. It will be apparent that driven brushes and other cleaning mechanism may be inserted in a similar manner within a tank 10 of my construction.

The deflector units 15 of our construction, as shown particularly in Figure 2 of the drawings, are positioned to extend transversely of the tank 10 from a position adjacent to and on one side of the longitudinal axis of the shell 11 or tank 10 across such axis towards one side wall portion thereof. Further, in accordance with a principle of our invention, each longitudinally-adjacent deflector unit 15 has a transversely staggered relationship or extends for its major distance towards an opposite side portion of the tank. It will thus be apparent that a man entering through the manhole portion 22 can freely move with his cleaning equipment throughout the full length of the tank 10. It will also appear that a cleaning tool, such as the sparger 27, can be fully inserted along the length of the tank between centrally-positioned legs 16a of a series of the deflector units 10. In this manner, fluid may be introduced into and removed from the inside of the tank 10 at the lowest level of the tank 1 which, as shown in Figure 1, may be of an elliptical cross-section.

Our construction is also such that continuous fillet welds may be employed to positively secure and seal off all joints in a relatively simple manner and the units 15 may be easily and securely mounted in position in the manner previously described.

By way of example, in a cargo tank for transporting milk under sanitary conditions, we have employed column leg members or parts 16a and 16b of 3 inch O. D. stainless steel tubing, and stainless steel sheet or plate for the deflector plate members or parts 17. The inner shell 11 is also of stainless steel and the inside is polished to a No. 4 finish. For example, the shell 11 and members 17 may be of 12 gauge, 302 stainless steel. The welds w are first ground and then polished to a No. 4 finish. All corners are provided with a smooth radius.

From the above description, it will be apparent that our construction provides an inner tank that is totally devoid of cracks, crevices, and dirt trapping joints, etc., and that it facilitates the cleaning-out operation. At the same time, the construction is such that it reinforces the tank 10 and makes possible the utilization and spacing of the units 15 to provide requisite strength and surge resisting characteristics and to further facilitate the cleaning-out of the tank interior.

What we claim is:

1. A cargo tank for transporting a flowable load such as a liquid which comprises, a longitudinally-extending curvilinear enclosing wall about the interior of the tank and opposite end walls secured to said enclosing wall to define an internal load-receiving chamber, a pair of integral deflector units in a transversely staggered and longitudinally spaced-apart positioned relationship within said enclosing wall, each of said units having a pair of column leg members spaced from each other and from the sides of said enclosing wall and a deflector plate member extending transversely across the tank between said column leg members within the end reaches of said column leg members and terminating short of said enclosing wall to define passageways with the upper and lower reaches of the column members and with said enclosing wall, and said passageways extending substantially the length of the tank, said enclosing wall having integral portions mounting opposite end portions of said leg members within the chamber, and means securing the end portions of said leg members to said mounting means and sealing off the joint therebetween, and means securing said deflector plate member between said pair of leg members and sealing off the joint therebetween.

2. A cargo tank as defined in claim 1 wherein, said enclosing wall has an access manhole portion in a top central portion thereof, one of said deflector units is positioned within the chamber between said manhole portion and one end wall, and the other said units is positioned within the chamber between said manhole portion and an opposite end wall.

3. A cargo tank as defined in claim 1 wherein, said integral portions of said enclosing wall are inwardly-extending collars within which end portions of said leg members are received, and said leg members are of tubular construction open through said collars to the outside of said enclosing wall.

4. A cargo tank for transporting a flowable load such as a liquid which comprises, a longitudinally-extending and transversely curvilinear enclosing wall and front and back end walls defining an internal load-receiving chamber within the tank, a pair of deflector units, each of said units have a deflector plate integrally connected between a pair of tubular leg column members, one leg member of said pair being of longer extent and the other leg member being of shorter extent, said leg member of longer extent being positioned adjacent a longitudinal central axis of said enclosing wall to extend between top and bottom portions thereof, said leg member of shorter extent being positioned adjacent to and in a spaced relation with a side portion of said enclosing wall to extend between top and bottom portions thereof, said units being positioned within the chamber in a longitudinally spaced-apart and open-compartment defining and transversely-staggered relationship with respect to each other, mounting means projecting inwardly of said enclosing wall and engaging opposite end portions of said leg members, and means sealing off joints between the opposite end portions of said leg members and said mounting means.

5. A cargo tank as defined in claim 4 wherein said mounting means comprises punched-in collars integral with said enclosing wall that receive the opposite end portions of said leg members therein.

6. A cargo tank as defined in claim 4 wherein each of said units is of substantially an H-shape.

7. A cargo tank as defined in claim 4 wherein, one of said end walls has a bottom outlet portion therein, and the leg members of longer extent of said units have a transversely-staggered relationship with respect to each other, so that a cleaning tool may be introduced through said outlet portion and longitudinally along the chamber of said enclosing wall.

8. A cargo tank as defined in claim 4 wherein, continuous fillet welds extend about joints between said deflector plate member and said pair of leg members of each of said units, and said last-mentioned means consists of continuous fillet welds about opposite end portions of said leg members.

9. A cargo tank for transporting a flowable load such as a liquid which comprises, a longitudinally-extending curvilinear enclosing wall and end walls defining an internal load-receiving chamber, reinforcing and load surge-dampening means positioned within the chamber in a substantially transversely-extending relationship thereacross, said means having at least a pair of units, each unit consisting of a pair of transversely spaced-apart tubular column leg members and a cross deflector plate member extending between and along and within end reaches of said leg members, said pairs of leg members of said units defining opposite side passageways with said enclosing wall and along the chamber, and said plate members of said units defining top and bottom passageways with said enclosing wall and along the chamber, said pair of units being positioned within the chamber in a longitudinally spaced-apart and transversely staggered relation with respect to each other, internal flange collars projecting inwardly of said enclosing wall to receive end portions of said leg members at their end reaches, and means sealing off joints between said leg members and said collars from said chamber.

10. A cargo tank for transporting a flowable load such as a liquid which comprises, a longitudinally-extending curvilinear enclosing wall about the interior of the tank and opposite end walls secured to said enclosing wall to define an internal load-receiving chamber, a pair of integral deflector units in a transversely staggered longitudinally spaced-apart positioned relationship within said enclosing wall, each of said units having a pair of transversely spaced-apart column leg members and a deflector plate member extending transversely across between side portions and within end reaches of said column leg members, one of said units being positioned to extend from one side of a central longitudinal axis of said enclosing wall across such axis and transversely across toward and into a passageway defining relation with the other side of said enclosing wall, and the other of said pair of units being positioned to extend from the other side of such axis across such axis and transversely across toward and into a passageway defining relation with the opposite side of said enclosing wall, said enclosing wall having integral portions mounting opposite end portions of said leg members within the chamber, and means securing the end portions of said leg members to said mounting means and sealing off the joint therebetween, and means securing said deflector plate member between said pair of leg members and sealing off the joint therebetween.

11. A cargo tank for transporting a flowable load such as a liquid which comprises, a longitudinally-extending curvilinear enclosing wall about the interior of the tank and opposite end walls secured to said enclosing wall to define an internal load-receiving chamber, a pair of integral deflector units in a transversely staggered and longitudinally spaced-apart positioned relationship within the chamber of said enclosing wall, each of said units having a pair of transversely spaced-apart column leg members and a deflector plate member extending transversely across between side portions and within end reaches of said column leg members, each unit of said pair of units defining a clearance spacing with top, bottom and opposite side portions of the interior of said enclosing wall, and each unit of said pair defining a relatively greater clearance spacing with respect to one side portion of said enclosing wall than the opposite side portion thereof, said enclosing wall having integral portions mounting opposite end portions of said leg members within the chamber, and means securing the end portions of said leg members to said mounting means and sealing off the joint therebetween, and means securing said deflector plate member between said pair of leg members and sealing off the joint therebetween.

12. A cargo tank for transporting a flowable load such as a liquid which comprises, a longitudinally-extending curvilinear enclosing wall and end walls defining an internal load-receiving chamber, reinforcing and load surge-dampening means positioned within the chamber in a substantially transversely-extending relationship thereacross, said means having at least one unit consisting of a pair of column leg members spaced from each other and from the sides of said wall, means to secure ends of said leg members to said enclosing wall, a cross deflector plate member extending between and along and within end reaches of said leg members, said plate member terminating short of the enclosing wall to define passageways with upper and lower reaches of said leg members and with said enclosing wall, said passageways extending substantially the length of the tank, and said surge-dampening means having at least a pair of said units positioned within the chamber in a longitudinally spaced-apart and transversely-staggered relationship with respect to each other.

13. A cargo tank for transporting a flowable load such as a liquid which comprises, a longitudinally-extending curvilinear enclosing wall and end walls defining an internal load-receiving chamber, reinforcing and load surge-dampening means positioned within the chamber in a substantially transversely-extending and staggered relationship thereacross, said means including a pair of hollow column leg members spaced from each other and from the sides of the enclosing wall, annular means to secure the ends of the leg members to the enclosing wall, and a cross deflector plate member extending between and within upper and lower reaches of and along said leg members to define passageways with the sides, top and bottom of the curvilinear enclosing wall, said pair of leg members and said plate member defining a substantial H-shape and being positioned closer to one side of the enclosing wall than an opposed side thereof, and said passageways extending effectively longitudinally of the tank and being obstructed by said load surge-dampening means along the enclosing wall only by said annular means thereof.

14. A cargo tank for transporting a flowable load such as liquid which comprises, a longitudinally-extending enclosing wall that with end walls defines an internal load-receiving chamber, a pair of surge-dampening deflector units of substantially H-shape positioned within the chamber in a longitudinally-spaced-apart and transversely-staggered relationship with each other; each of said units having a pair of leg members, and also having a cross deflector plate member extending between said leg members and within their confines; and each unit of said pair of units having a clearance spacing with top, bottom and opposite side portions of the interior of said enclosing wall to define longitudinal passageways along the sides, top and bottom of said enclosing wall; said enclosing wall having collars secured to and sealingly-receiving end portions of said leg members therein to securely mount said units in position with respect to said enclosing wall.

References Cited in the file of this patent

UNITED STATES PATENTS

| | | |
|---|---|---|
| 1,040,401 | Perry | Oct. 8, 1912 |
| 2,664,911 | Thompson et al. | Jan. 5, 1954 |

FOREIGN PATENTS

| | | |
|---|---|---|
| 328,136 | Italy | July 30, 1935 |